H. WEIDNER.
SPRING WHEEL.
APPLICATION FILED OCT. 28, 1913.
1,135,869.
Patented Apr. 13, 1915.
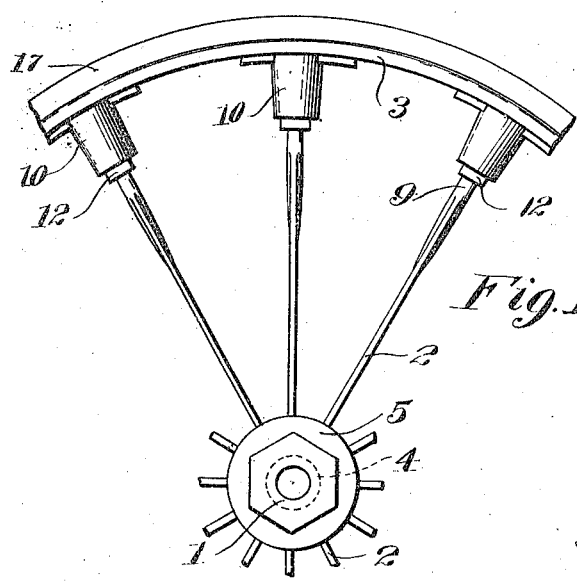
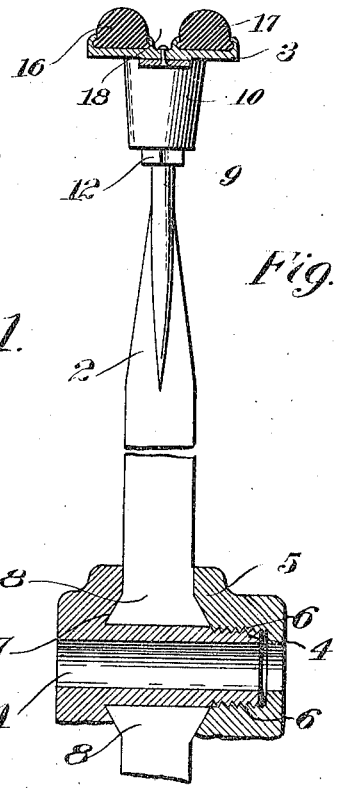
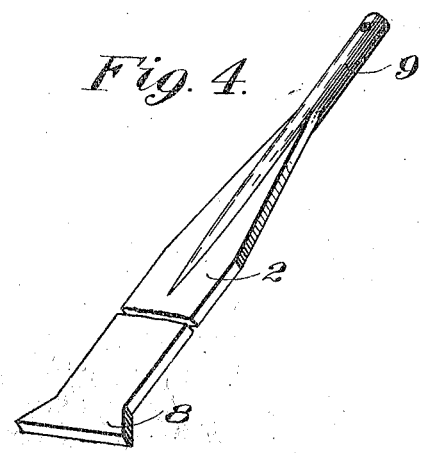
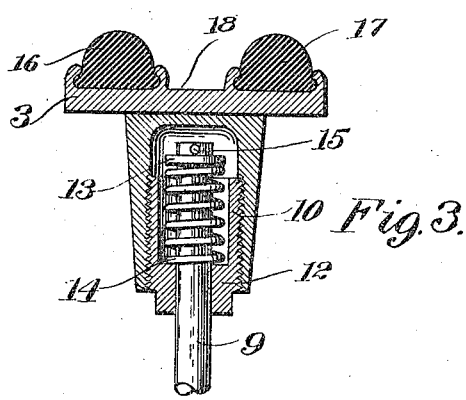
Witnesses
Inventor
Hayes Weidner.
By Victor J. Evans
Attorney

UNITED STATES PATENT OFFICE.

HAYES WEIDNER, OF CLIFFS, ARIZONA.

SPRING-WHEEL.

1,135,869.

Specification of Letters Patent.   Patented Apr. 13, 1915.

Application filed October 28, 1913.   Serial No. 797,839.

*To all whom it may concern:*

Be it known that I, HAYES WEIDNER, a citizen of the United States, residing at Cliffs, in the county of Coconino and State of Arizona, have invented new and useful Improvements in Spring-Wheels, of which the following is a specification.

This invention relates to spring wheels for automobiles, the object of the invention being to provide a wheel the construction of which will provide for the necessary resiliency or spring action to enable the ordinary pneumatic tire now in common use to be dispensed with, the wheel embodying a novel construction and arrangement of spokes and spring connections between the spokes and rim or felly of the wheel whereby all jars and road shocks are absorbed before being transmitted to the axles and body of the machine.

A further object of the invention is to provide a novel form of tire which will provide a broad bearing surface upon the road and which will avoid all tendency of the machine to skid laterally when operated upon a slippery surface or in steering the machine in a curved path.

With the above and other objects in view, the invention consists in the construction, combination and arrangement of parts, as will hereinafter be more fully described, illustrated and claimed.

In the accompanying drawings: Figure 1 is a side elevation of a sufficient portion of a vehicle wheel to illustrate the application of the present invention thereto. Fig. 2 is a radial section through the wheel on an enlarged scale. Fig. 3 is an enlarged detail section through one of the spring casings and the rim and tire. Fig. 4 is a detail perspective view of one of the spokes.

Referring to the drawings 1 designates the wheel hub, 2 the spokes and 3 the wheel rim or felly.

In carrying out the present invention, the hub 1 embodies a main section 4 and a movable or separable section 5 which is threaded on the main section 4 as shown at 6. The sections 4 and 5 are formed with undercut or dove-tailed spoke sockets 7 in which the inner ends of the spokes 2 are received as best illustrated in Fig. 2, the inner end of each spoke being considerably greater in width than the outer end thereof and being dove-tailed in shape as shown at 8 so as to fit in the socket 7 in which it is secured by tightening the separable and threaded section 5 of the hub.

Each spoke is formed as shown in Fig. 4, the main body of the spoke consisting of a flat spring of steel or similar material, said spoke gradually narrowing from its inner toward its outer end and the outer end portion thereof for several inches being round in cross section as shown at 9. This rounded outer end portion of the spoke is received in a tubular casing 10 which is secured in fixed relation to the rim 3 and extends inwardly therefrom. The casing 10 is internally threaded as indicated at 11 to receive a bushing 12 through which the portion 9 of the spoke is adapted to slide.

Adjacent to its outer extremity, each spoke is provided with a collar or washer 13 forming a seat for the outer end of a coiled expansion spring 14 which encircles the outer end of the spoke as shown in Fig. 3, said spring being confined between the shoulder or collar 13 and the bushing 12, the collar 13 being held in place by a detachable pin 15 preferably threaded through a transverse opening in the extremity of the portion 9 of the spoke. All of the spokes are mounted in the same manner as hereinabove described so that the spring action of all the spokes and the resisting action of all the springs 14 contribute to impart the necessary resiliency to the wheel as a whole to absorb and take up all road shocks.

The tire is made in two sections 16 and 17 as illustrated in Fig. 2, each of the sections being substantially semi-cylindrical in cross section and said sections being placed close to the opposite side edges of the rim 3, leaving an intervening space or channel 18 between the sections thus serving to prevent lateral or side skidding of the tires and enabling them to pack down loose material such as sand and mud and therefore obtain a firm foot-hold on the road. The tire sections 16 and 17 will ordinarily be composed of rubber or a composition of rubber and in addition to the puncture-proof qualities of the tire, said tire also forms a practically non-skid construction and produces a relatively wide tractive surface which as stated tends to pack down the soft surface of a road without the tendency to sink in sand or dust or other light surface material. This gives increased speed to the vehicle in the case of an automobile or motor truck and places less burden on the engine.

The simple manner in which the parts of the wheel are combined renders it possible to replace broken parts thereof such as spokes and suspension springs at the outer ends of the spokes. In case of the breakage of a spoke or one of the springs 14, the spoke or spring may be easily removed by removing the detachable section of the hub and also removing the bushing or reducer 12 above referred to.

What I claim is:

1. A wheel comprising a hub, a rim, tubular casings carried by the rim and extending inwardly therefrom, and a series of substantially straight spokes each comprising a longitudinally non-extensible transversely flexible spring body disposed edgewise transversely of the wheel, the inner end of said spoke being attached to the hub and the outer end of said spoke being slidable in one of said casings, a bushing fitted in said casing and having an opening through which the spoke is slidable, a collar on the outer extremity of said spoke, and a suspension spring interposed between said collar and bushing.

2. A wheel comprising a hub embodying separable sections, a rim, tubular casings carried by the rim and extending inwardly therefrom, and a series of substantially straight spokes each comprising a longitudinally non-extensible transversely flexible spring body disposed edgewise transversely of the wheel and having an expanded inner end which is detachably held between the sections of the hub, the outer end of said spoke being slidable in said casing, a bushing removably fitted in the inner end of said casing and having an opening through which the outer end of the spoke slides, a collar on the outer extremity of said spoke, and a suspension spring interposed between said collar and bushing.

In testimony whereof I affix my signature in presence of two witnesses.

HAYES WEIDNER.

Witnesses:
JOE T. GREENLAW,
TAYLOR CLARK.